(12) United States Patent
Mantle

(10) Patent No.: US 7,709,994 B2
(45) Date of Patent: May 4, 2010

(54) BRUSH BOARD FOR HIGH CURRENT ELECTRIC MOTOR

(76) Inventor: Elton L. Mantle, 8206 Jaguar Path, Liverpool, NY (US) 13090

( * ) Notice: Subject to any disclaimer, the term of this patent is extended or adjusted under 35 U.S.C. 154(b) by 344 days.

(21) Appl. No.: 11/869,767

(22) Filed: Oct. 10, 2007

(65) Prior Publication Data

US 2009/0096315 A1 Apr. 16, 2009

(51) Int. Cl.
*H02K 13/00* (2006.01)
(52) U.S. Cl. ............................. 310/239; 310/242
(58) Field of Classification Search .............. 310/238, 310/239, 242, 246
See application file for complete search history.

(56) References Cited

U.S. PATENT DOCUMENTS 4,847,528 A * 7/1989 Eguchi et al. ............... 310/239
6,404,093 B1 * 6/2002 Bastide et al. ............... 310/239
2007/0108864 A1 * 5/2007 Suzuki ....................... 310/239
2008/0084124 A1 * 4/2008 Golab et al. ................. 310/43

* cited by examiner

*Primary Examiner*—Dang D Le
(74) *Attorney, Agent, or Firm*—Bernhard P. Molldrem, Jr.

(57) ABSTRACT

A brush board assembly for a DC or AC motor employs a spool-shaped frame unitarily formed of a mounting plate, a series of support members that extend axially and define the brush holders, and an outer support plate that is generally parallel to the mounting plate. This frame may be molded of a high strength, high temperature resin for heavy duty motor use. Brush hold down springs are mounted onto push-in carriers that fit into receptacles on the support members. Preferably, scroll or volute springs are employed, and a stop arm on the carrier allows the free end of the spring to be held out of the way for installation or brush change out.

12 Claims, 5 Drawing Sheets

BRUSH BOARD FOR HIGH CURRENT ELECTRIC MOTOR

BACKGROUND OF THE INVENTION

This invention is directed to electromagnetic rotating machines, and is more particularly directed to an assembly for holding brushes in position in an electrodynamic motor. The invention is more particularly concerned with a brush board and brush holder assembly that may be molded of a high performance plastic resin, with the brush board frame and brush holders unitarily formed for increased strength and durability under heavy duty operating conditions.

In DC motors of the type in which a rotary armature is supplied current through a rotary commutator, it is typical to mount the brushes in brush holders or brush boxes that are attached to a frame or support plate, i.e., a brush board, which is mounted to one end of the motor housing. This will typically have a center aperture to accommodate the commutator structure. The brush boxes or brush holders are separate items, usually made of steel or brass, and are mounted to the brush board by means of mechanical fasteners such as bolts. The carbon brushes are positioned in rectangular profile cavities or chambers, where brush springs urge the brushes to move inward (radially) to contact the contact bars of the commutator (or slip rings in the case of an AC motor).

A number of brush holder arrangements have been presented in the literature, and some of these are illustrated in connection with DC motors as shown in U.S. Pat. No. 5,208,499 to Barber et al., U.S. Pat. No. 5,004,943 to Gagneux, U.S. Pat. No. 4,694,214 to Stewart, Sr., and U.S. Pat. No. 4,293,789 to King. These all employ a single support plate with a number of brush holders mounted or formed on it, and each has a limited ability to withstand temperature loads. This construction can limit the motor to lighter duty operation. Also, in the motors of the prior art it has been difficult to replace worn brushes, and it is usually necessary to disassemble the brush board to achieve that, if it is even possible to do so.

Motors of this type are frequently used in electric vehicles, such as fork lifts and golf carts, where the motor is supplied with low voltage DC, typically 12 to 120 volts, and has a relatively high current draw, e.g., from several amperes to several hundred amperes or more. There can be a substantial voltage drop through the brushes and commutator, producing significant heating of the brush holder arrangement during normal operation.

OBJECTS AND SUMMARY OF THE INVENTION

Accordingly, it is an object of this invention to provide a brush board assembly for use in an electric motor, which is strong and durable, simple to install, and which avoids the drawbacks of the prior art.

It is another object to provide a brush board assembly in which the frame portion is unitarily formed of a high performance plastic resin, and in which brush hold down springs and carriers for them may be inserted into the frame portion by hand.

It is a related object for the brush board assembly to simplify change out and replacement of worn brushes.

It is a further object to provide a heavy duty brush board that is capable of meeting or exceeding UL classifications up to Class H, and withstanding temperatures of 210 degrees Celsius, so that it does not fail in heavy duty operation.

According to an aspect of this invention, a brush board assembly is provided for an electric motor of the type having a rotary armature situated within a motor housing, and in which the armature has an axial rotary shaft, with a commutator positioned on said shaft. For a typical DC motor, the commutator can comprise a series of contact bars, whereas for an AC motor, the commutator can have a two or more slip rings which are contacted by the carbon brushes.

The brush board assembly is in the form of a brush board frame, with incorporated brush holder structure, and a number of insertable brush-hold down members which each include a brush hold-down spring and a carrier for the spring.

The brush board frame is unitarily formed of an annular mounting plate, a plurality of brush holders, and an outer support plate. The mounting plate is adapted to be mounted onto an end of the housing and has a circular central opening for admitting the commutator. The brush holders are formed on the mounting plate and are distributed around the central opening. Each brush holder includes a first support member and a second support member. These are positioned parallel to one another and extend generally radially from the mounting plate. The first and second support members define between them a respective brush chamber of generally rectangular profile. There is a brush hold-down receptacle for the brush hold down members formed in each of the first members. The outer support plate is situated on the outer ends of the brush holder structure and parallel to the annular mounting plate. That is, the outer support plate extends in a plane that is generally transverse and parallel to the mounting plate. The brush board frame is unitarily molded of a suitable plastic resin, e.g., a polyamide or a fiberglass-reinforced polyphenylene sulphide, having a capability of withstanding temperatures of 210° C. or higher. For some materials, the product may be subjected to a quenching step after molding. Preferably, the plastic resin will have similar temperature behavior, e.g., thermal expansion coefficient, as brass. The brush retaining hold down members each include a spring carrier that has a tab or similar member that can be inserted into the hold down receptacle of the associated one of the first support members. The brush hold-down spring is mounted onto the carrier, and is adapted to urge the brush member axially inward in the respective brush chamber, so that the brush firmly contacts the commutator of the rotary armature. Of course, the plastic resin material would include suitable fillers.

In a preferred embodiment, the spring carrier has a tab that is insertable radially into the associated hold down receptacle, and the tab has a detent recess or groove that engages corresponding structure in the hold down receptacle. These features cooperate to retain the spring carrier in place. In the preferred embodiment, the brush hold-down spring is in the form of a scroll or volute spring that is coiled onto a post projecting from said carrier. The carrier also has a stop arm projecting laterally to selectively engage a free end of said volute spring. The end of the spring can be lifted off the stop arm after the carrier is pushed home, permitting the spring to push in against the carbon brush. Also, when it is needed to replace the brush, the free end of the spring can be lifted back and placed behind the stop arm. Then the brush can be slid out and replaced. Also in this embodiment, the first support members each have a cutout formed therein to admit at least a portion of the associated volute spring.

Preferably, the outer support plate is in the form of a flat ring or disc having a central opening. The support plate has bolt holes for accepting threaded fasteners so that the brush board frame can be attached to the motor housing, and said outer support plate has tool access openings therein aligned with the bolt holes.

The above and many other objects, features, and advantages of this invention will become apparent from the ensuing detailed description of a preferred embodiment, which is illustrated in the Accompanying Drawing.

DETAILED DESCRIPTION OF A PREFERRED EMBODIMENT

Figure 1:
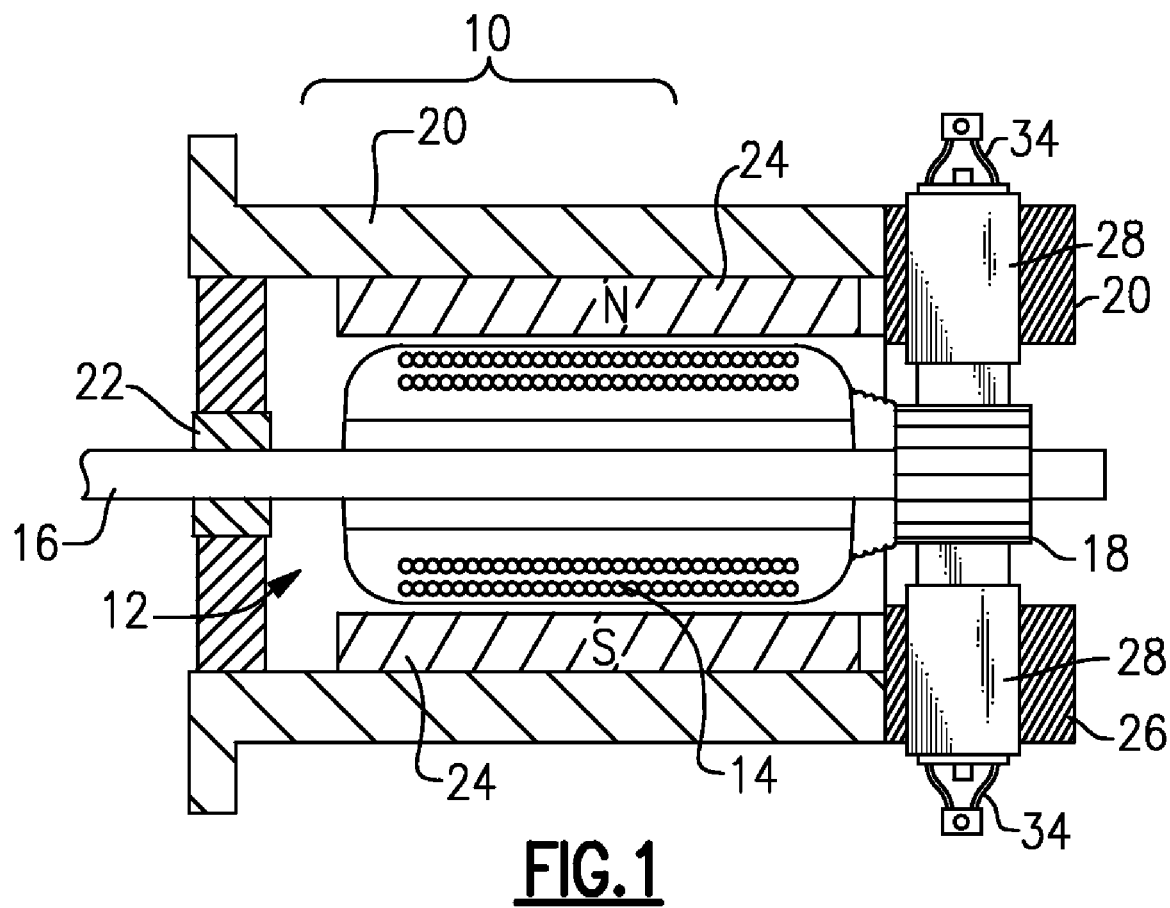
FIG. 1 is a longitudinal schematic view of a brush-type electric motor, employing the brush board and brush holder arrangement according to a preferred embodiment of the present invention.

Now with reference to the Drawing, FIG. 1 shows schematically a DC motor 10 incorporating the brush board arrangement according one embodiment of the invention. Here the arrangement motor 10 is shown with a rotor 12 having a rotary armature 14 that consists of a number of windings upon a rotor shaft 16. A commutator 18 is disposed at one end of the shaft. Here, the commutator is in the form of a series of contact bars arranged cylindrically about the shaft. The principles of this invention could also be applied to motors of the type having a commutator arrangement formed of number of slip rings, e.g., an AC motor. The rotor is housed in a case or housing 20, with a bearing 22 at one end supporting the shaft 16. Here the stator or field magnet element of the motor is formed by a plurality of permanent magnets 24, 24 mounted onto an interior wall of the housing 20.

A brush board and brush holder assembly 26, of the type that embodies the present invention, is mounted on the end of the housing 20 at which the commutator 18 is located. The assembly 24 supports a number of brushes 28, i.e., contact members that are typically of a rectangular cross section and may be made of carbon, are fitted into brush chambers in the assembly, and are urged radially inward so as to contact the contact bars of the commutator 18. There is typically another bearing beyond the commutator, i.e., to the right in this view, but that is omitted from the drawing. The housing 20 may be made of metal or made of modern materials, e.g., a reinforced plastic resin capable of withstanding the temperatures and forces that may occur in heavy duty operation.

Figure 2:
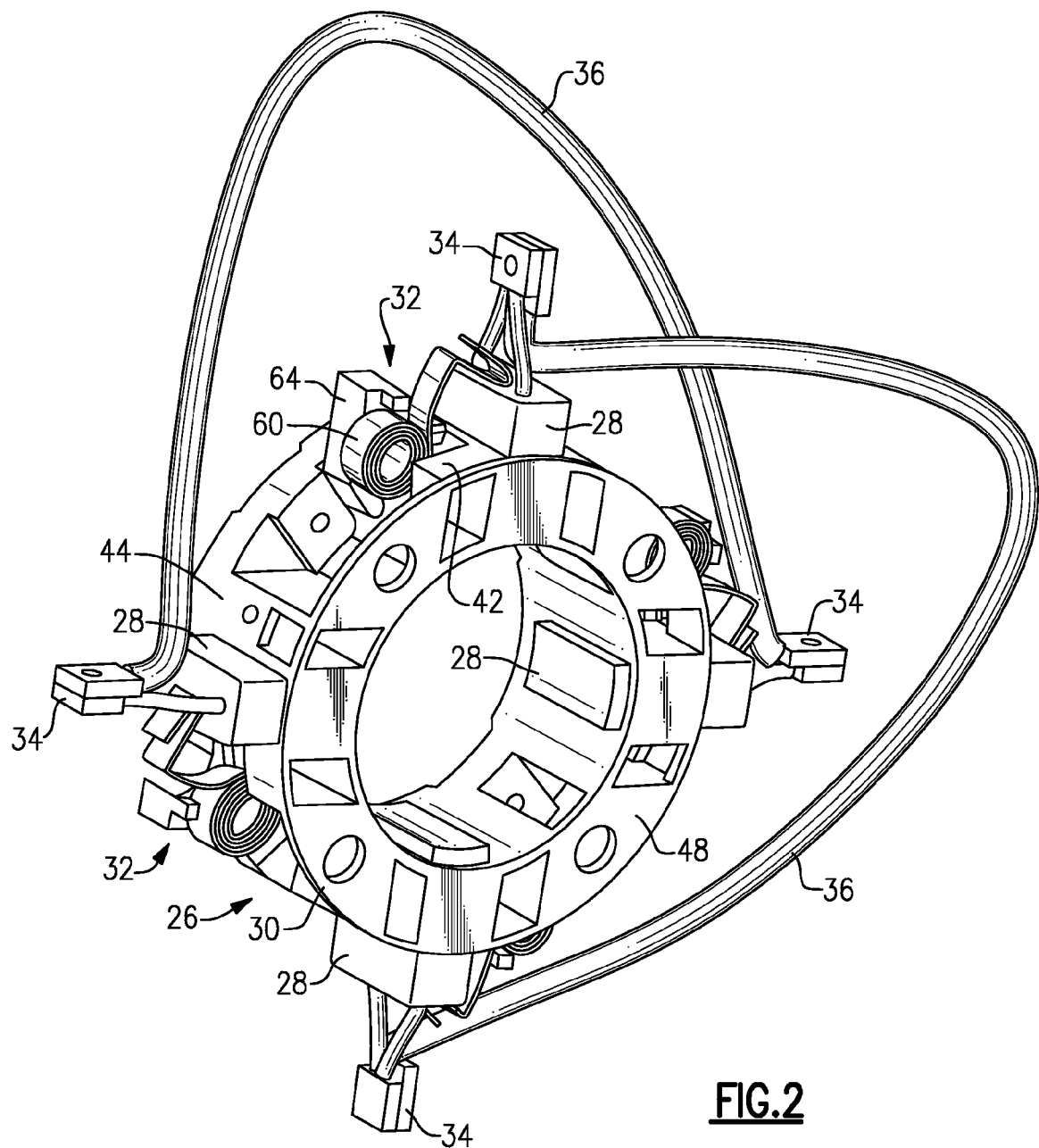
FIG. 2 is a perspective view of the brush board assembly of this embodiment.
Figure 3:
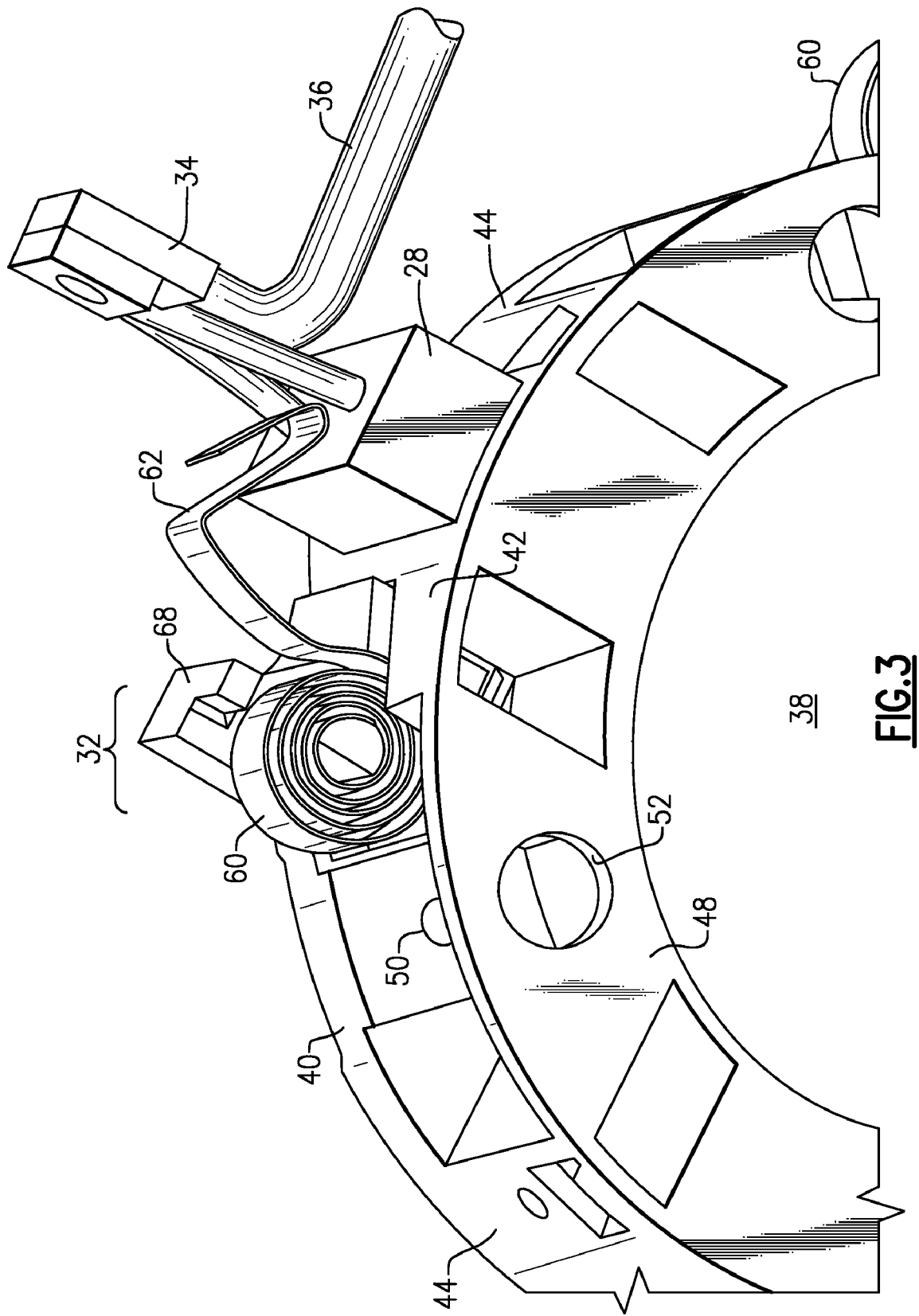
FIG. 3 is another perspective view showing detail of this embodiment.
Figure 4:
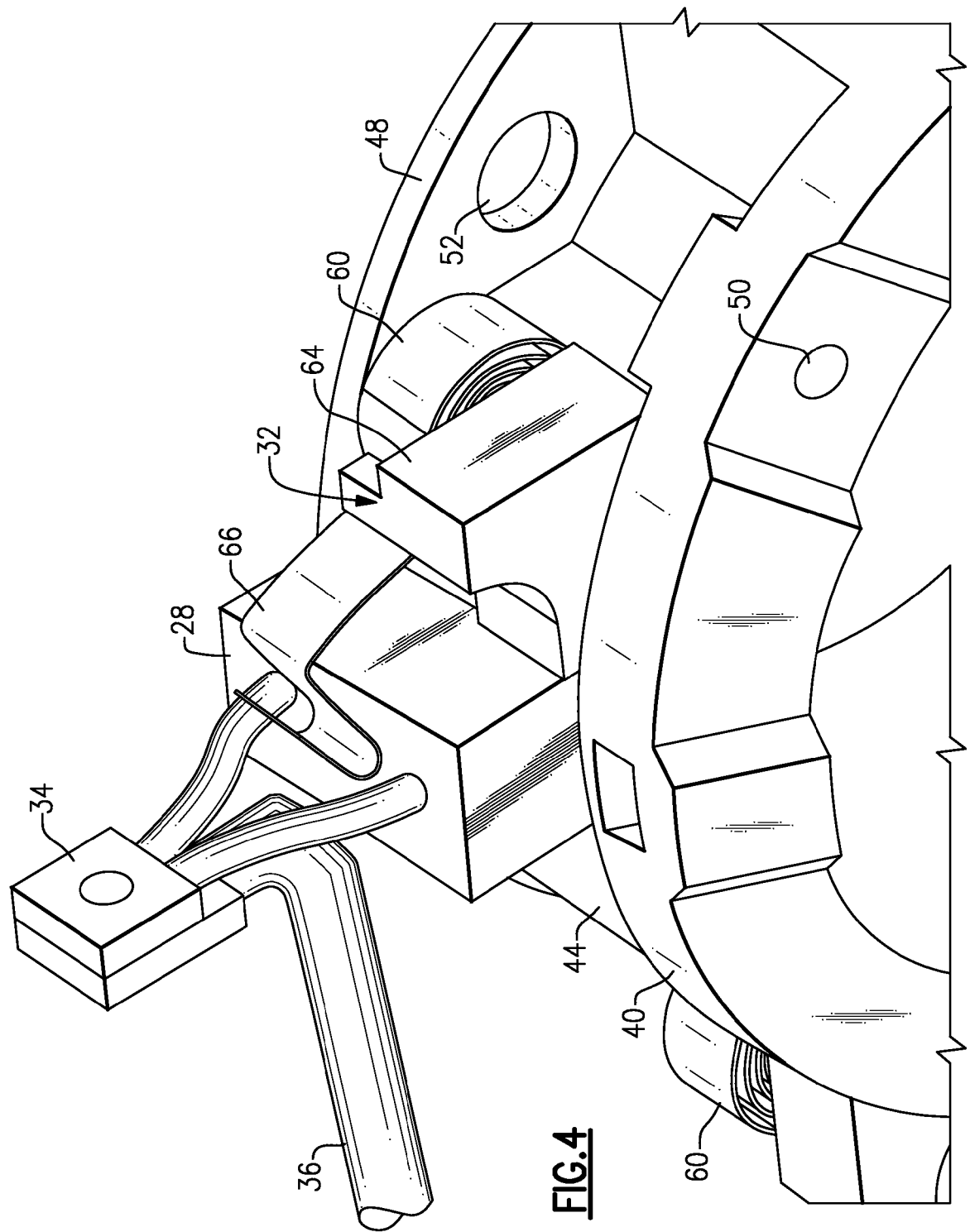
FIG. 4 is another perspective view showing further detail of this embodiment.
Figure 5:
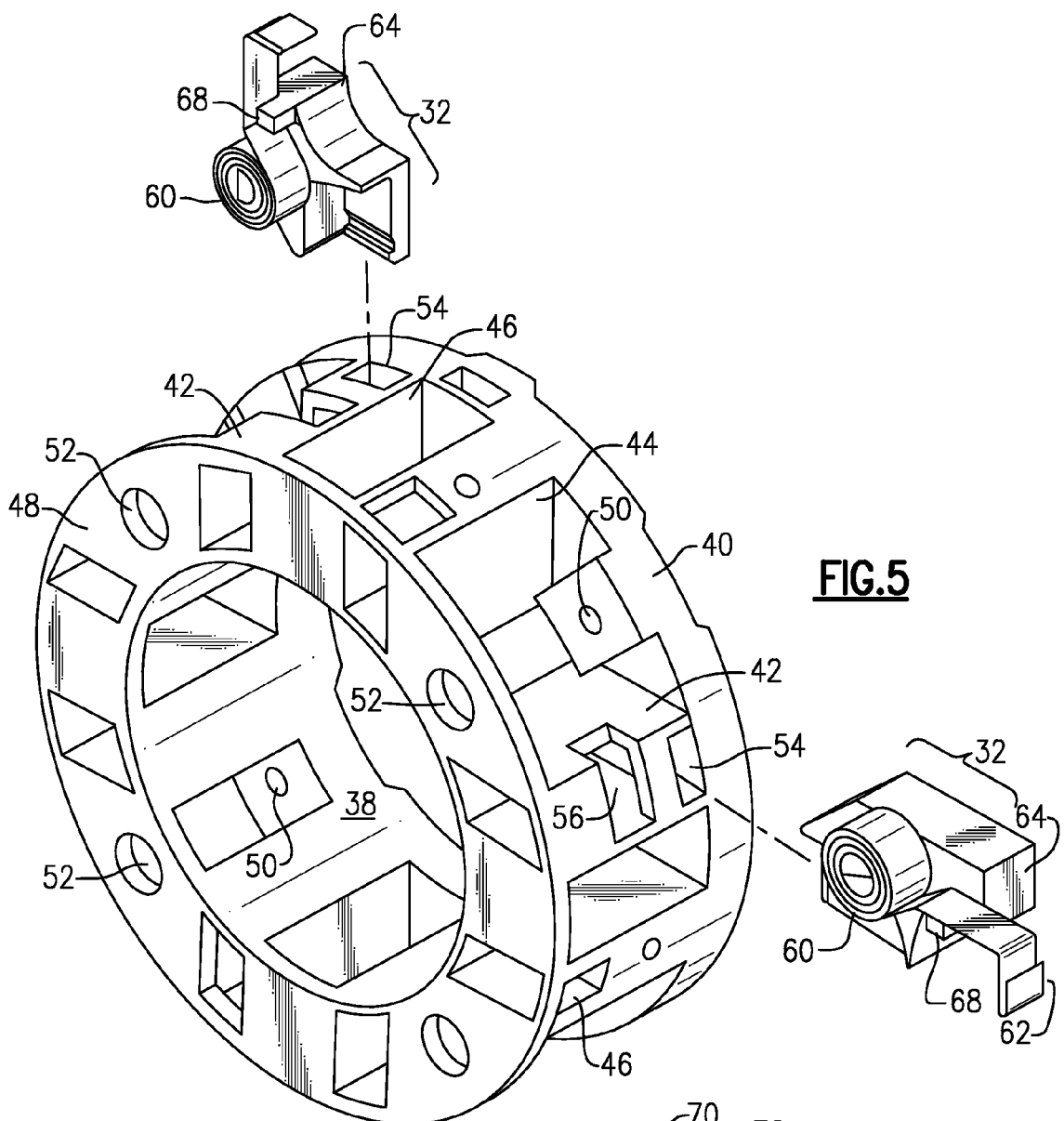
FIG. 5 is a perspective assembly view thereof.
Figures 6, 7:
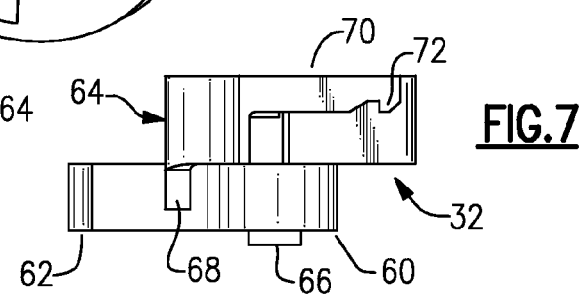
FIGS. 6, 7 and 8 are end, top and side views of the spring hold down members of this embodiment.
Figure 8:
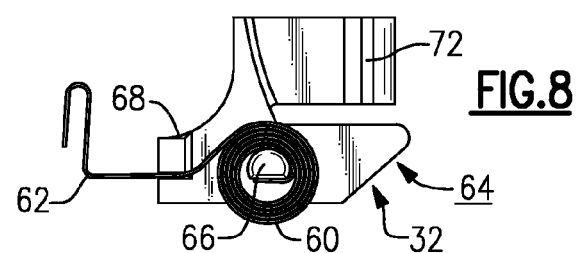

The brush board and holder assembly 26 of one preferred embodiment of this invention is shown in the perspective view of FIG. 2, and in more detail in the partial perspective views of FIGS. 3 and 4. FIG. 3 shows the assembly 26 from the distal or outer side, and FIG. 4 shows the assembly from the proximal side, i.e., the side that mounts onto the housing 20.

As shown in FIG. 2, the brush board assembly 26 has a brush board frame 30 that is generally in the form of a spool, and a number of associated brush spring hold-down members 32 that are inserted into receptacles formed in the frame 28, as will be discussed in detail later. The spring hold-down members 32 are each associated with a respective brush 28. In this embodiment, there are four brushes 28, positioned ninety degrees from one another. Each brush has an associated pigtail 34 for applying electrical current. In this embodiment there is a jumper wire 36 connecting the pair of brushes 28 that are spaced 180 degrees apart, and another jumper wire 36 connecting the other two brushes, which are also disposed 180 degrees apart. There may be any number of brushes, depending on the desired motor configuration. In some cases, there be a pair of brushes at each position, stacked axially one above the other, rather than the single brush per position as shown here, where a higher applied current is called for.

The frame 30 is formed with a generally cylindrical central opening or passage 38, which serves as the place where the motor commutator is located.

With further reference to FIGS. 3 and 4, the structure of the frame 30 and, with reference to FIGS. 5 to 9, the brush hold-down members 32 of the present embodiment can be explained in more detail.

The frame 30 has a mounting plate or board 40, generally in the form of a planar disk or ring, as illustrated, with various protrusions and recesses as need be to match corresponding structure (not shown) on the case or housing 20 to which it is attached. For each brush, there is a pair of support members, i.e., a first support member 42 and a second support member 44 (see, e.g., FIG. 5) that extend generally axially from the mounting plate 40. The first and second support members 42, 44 are formed integrally, i.e., molded, with the mounting plate 40, and these support member define, between one another, a rectangular profile recess or cavity 46 that serves as a brush chamber for the associated brush 28. These members 42, 44 are hollow, as a result of the molding process, which helps in heat dissipation. The hollow structure also relieves some weight. The brush chamber can be of any desired shape, to match the profile of the brush, and permits radial motion of the brush so that it can be pressed against the motor commutator.

An upper support plate 48, in the form of a planar ring or disk is unitarily formed with the support members 42, 44 at their distal or outer ends, and provides a rigidity for the brush holders that are formed by the support members. Also, it can be seen that the mounting plate 40 and upper support plate 48 form the upper and lower walls of the brush chambers 46.

As shown in these views, there are screw holes 50 provided at several locations in the mounting plate 40 to admit a bolt or similar threaded fastener (not shown here) to be inserted to attach the frame 30 to the motor housing 20. For each screw hole 50 there is an associated access opening 52 in the upper support plate 48 to permit use of a screwdriver, nut driver, wrench, or other tool.

At one end of each first support member 42 adjacent the mounting plate 40 there is a receptacle 54, i.e., a rectangular opening to receive a tab of the associated spring hold-down member 32, which will be discussed shortly. Also, each of the first members 42 has a cutout or recess 56 to accommodate the brush hold-down spring, as will also be discussed just below.

As shown in FIGS. 5 to 9, each brush hold-down member 32 has a spring 60, which is here coiled as a volute or scroll, with a free end 62 that serves to press in against the carbon brush 26. The brush hold-down member also has a carrier 64, molded of a suitable durable plastic material, to hold the spring 60 and which may be installed by hand by pushing the carrier into place on the associated first member 42. The carrier has a post 66 projecting from one side, on which the coiled spring 60 is mounted. There is also a stop arm 68 formed on the same side of the carrier 64, and this serves to hold the spring free end 62 back and out of the way when the hold-down member is being installed, or when a brush needs to be changed out. After installation, the free end 62 of the spring is simply moved, e.g., by hand, around the stop arm, where it can spring down onto the outer face of the brush.

As shown, the carrier 64 has an elongated tab 70 that projects in the direction radially toward the center of the brush board assembly. The tab 70 is inserted into the associated recess or receptacle 54. Each tab has detent structure, e.g., a groove or recess 72 formed near its tip, which cooperates with mating structure (not shown here) inside the receptacle 54 so that the carrier 64 is retained firmly in place once the hold-down member has been pushed home. A detent release can be incorporated in each position, if desired, to permit the carriers 64 to be pulled out if replacement is needed.

Other openings and recesses are shown here, but not discussed. Many of these are the result of the molding process, or may be incorporated for attaching an additional member as needed for the particular electric motor. The person skilled in the art of molds and dies for plastics members of this type would not require an explanation.

The brush board assembly of this invention, with its integrally formed brush holders and support members, provides for simple installation, minimizing the chance of installation errors, and is more durable than the prior designs having separate brush carriers mounted on a single brush board. The spring hold-down members are simple to install, without need for tools, and permit rapid change out of brushes when necessary.

While the invention has been described here with reference to a preferred embodiment and various alternatives thereto, it should be apparent that the invention is not limited to such embodiment(s). Rather, many variations would be apparent to persons of skill in the art without departing from the scope and spirit of this invention, as defined in the appended Claims.

I claim:

1. A brush board assembly for an electric motor of the type having a rotary armature situated within a motor housing, the armature having an axial rotary shaft and a commutator positioned on said shaft; the brush board assembly comprising
    a brush board frame including
        an annular mounting plate adapted to be mounted onto an end of the housing and having a circular central opening for admitting said commutator;
        a plurality of brush holders formed on said mounting plate and distributed around said central opening, each said brush holder including a first support member and a second support member extending generally axially from the annular mounting plate and defining between them a brush chamber, the first support member of each said brush holder including a brush hold-down receptacle; and
        an outer support plate extending in a plane that is generally parallel to said annular mounting plate at an axial outer end of said brush holders;
    wherein the brush board frame is unitarily molded of a suitable plastic resin having a capability of withstanding temperatures of 210° C.; and
    a plurality of brush retaining hold down members, each including a spring carrier that is insertable into the hold down receptacle of a respective one of said first support members, and a brush hold-down spring mounted thereon and adapted to urge a brush member radially inward in the respective brush chamber.

2. Brush board assembly according to claim 1 wherein said plastic resin is a polyamide.

3. Brush board assembly according to claim 1 wherein said plastic resin is a fiberglass reinforced polyphenylene sulphide.

4. Brush board assembly according to claim 1 wherein said plastic resin brush board frame is quenched after being molded.

5. Brush board assembly according to claim 1 in which said plastic resin has thermal expansion properties matching those of brass.

6. Brush board assembly according to claim 1 in which each said spring carrier includes a tab that is insertable radially into the associated hold down receptacle, and said tab includes a detent recess that engages corresponding structure in the hold down receptacle to retain the spring carrier in place therein.

7. Brush board assembly according to claim 6 wherein said brush hold-down spring includes a volute spring coiled onto a post projecting from said carrier.

8. Brush board assembly according to claim 7 wherein said carrier further includes a stop arm projecting laterally therefrom to selectively engage a free end of said volute spring.

9. Brush board assembly according to according to claim 6 wherein each said first support member has a cutout therein to admit at least a portion of the associated volute spring.

10. Brush board assembly according to claim 1 wherein said outer support plate is in the form of a disc having a central opening therein.

11. Brush board assembly according to claim 10 wherein said mounting plate has bolt holes formed therein for accepting threaded fasteners for attaching the brush board frame to said motor housing, and said outer support plate has access openings therein aligned with said bolt holes.

12. Brush board assembly according to claim 1 wherein each said brush holder is of generally rectangular profile, with sides being formed respectively by said first support member, said second support member, said support plate, and said mounting plate.

* * * * *